(12) United States Patent
Knauf et al.

(10) Patent No.: US 11,298,737 B2
(45) Date of Patent: Apr. 12, 2022

(54) DEVICE AND METHOD FOR THE AUTOFRETTAGE OF A WORKPIECE

(71) Applicants: UHDE HIGH PRESSURE TECHNOLOGIES GmbH, Hagen (DE); thyssenkrupp AG, Essen (DE)

(72) Inventors: Wilfried Knauf, Herdecke (DE); Klaus Uhlig, Hagen (DE)

(73) Assignees: UHDE HIGH PRESSURE TECHNOLOGIES GMBH, Hagen (DE); THYSSENKRUPP AG, Essen (DE)

( * ) Notice: Subject to any disclaimer, the term of this patent is extended or adjusted under 35 U.S.C. 154(b) by 163 days.

(21) Appl. No.: 16/472,366

(22) PCT Filed: Jan. 5, 2018

(86) PCT No.: PCT/EP2018/050286
§ 371 (c)(1),
(2) Date: Jun. 21, 2019

(87) PCT Pub. No.: WO2018/134063
PCT Pub. Date: Jul. 26, 2018

(65) Prior Publication Data
US 2019/0358693 A1 Nov. 28, 2019

(30) Foreign Application Priority Data
Jan. 20, 2017 (DE) .................... 10 2017 200 917.9

(51) Int. Cl.
*B21D 26/033* (2011.01)
*C21D 7/12* (2006.01)

(52) U.S. Cl.
CPC ............. *B21D 26/033* (2013.01); *C21D 7/12* (2013.01)

(58) Field of Classification Search
CPC ... C21D 8/00; C21D 7/12; C21D 7/00; C21D 7/10; B23P 9/00; B23P 9/025;
(Continued)

(56) References Cited

U.S. PATENT DOCUMENTS 3,751,954 A * 8/1973 Ezra .................... B21D 26/08
72/56
4,571,969 A * 2/1986 Tomita .................... B23P 9/00
72/56
(Continued)

FOREIGN PATENT DOCUMENTS

CN 103 433 702 A 12/2013
DE 15 83 992 B 6/1971
(Continued)

OTHER PUBLICATIONS

English Translation of International Search Report issued in PCT/EP2018/050286, dated Mar. 5, 2018.

*Primary Examiner* — Jessica Cahill
*Assistant Examiner* — Jared O Brown
(74) *Attorney, Agent, or Firm* — thyssenkrupp North America, LLC (57) ABSTRACT

A method for the autofrettage of a workpiece may involve arranging the workpiece between a first securing means and a second securing means, and applying high-pressure fluid to an internal volume of the workpiece that is formed between the first and second securing means. A die or ram may be driven into the internal volume through an inlet in the first securing means. Consequently, as a result of the ram being advanced, not only is a fluid pressure generated in the internal volume, but also the workpiece is mechanically autofrettaged by way of the ram. A device may be employed to perform such hydromechanical autofrettage of the workpiece.

12 Claims, 7 Drawing Sheets

(58) Field of Classification Search
CPC .. B21D 26/047; B21D 26/043; B21D 26/041; B21D 26/033; B21D 26/02
USPC ...................................................... 72/58, 57
See application file for complete search history.

(56) References Cited

U.S. PATENT DOCUMENTS

| | | | | | |
|---|---|---|---|---|---|
| 5,177,990 | A | * | 1/1993 | Isgen | B23P 9/00 72/54 |
| 6,931,776 | B2 | * | 8/2005 | Wagner | B21C 1/24 72/61 |
| 7,818,986 | B1 | * | 10/2010 | Parker | C21D 7/08 72/58 |
| 8,408,033 | B2 | * | 4/2013 | Kampmann | C21D 7/12 72/58 |
| 2005/0252263 | A1 | * | 11/2005 | MacEwen | B21D 51/26 72/55 |
| 2010/0154501 | A1 | * | 6/2010 | Kampmann | C21D 7/12 72/54 |
| 2015/0296864 | A1 | | 10/2015 | Nünnerich et al. | |

FOREIGN PATENT DOCUMENTS

| | | | | |
|---|---|---|---|---|
| DE | 41 15 284 | A | 11/1992 | |
| DE | 202006017613 | U1 * | 2/2007 | ............... C21D 7/12 |
| DE | 10 2006 054440 | B | 12/2007 | |
| DE | 10 2011 001 763 | A | 1/2012 | |
| EP | 1 384 534 | B | 1/2005 | |
| EP | 1657007 | A1 * | 5/2006 | ........... B21D 26/043 |
| EP | 2 298 940 | B | 3/2011 | |
| JP | H04 167944 | A | 6/1992 | |
| JP | H04167944 | A * | 6/1992 | |
| WO | 2016124660 | A | 8/2016 | |

\* cited by examiner

DEVICE AND METHOD FOR THE AUTOFRETTAGE OF A WORKPIECE

CROSS REFERENCE TO RELATED APPLICATIONS

This application is a U.S. National Stage Entry of International Patent Application Serial Number PCT/EP2018/050286, filed Jan. 5, 2018, which claims priority to German Patent Application No. DE 10 2017 200 917.9, filed Jan. 20, 2017, the entire contents of both of which are incorporated herein by reference.

FIELD

The present disclosure generally relates to tools and methods for the autofrettage of workpieces.

BACKGROUND

Autofrettage is a method for strengthening, improving or refining internal surfaces of workpieces which are exposed to an internal pressure, for example machine parts, machine elements, (high-)pressure vessels, high-pressure pipelines, pump bodies. Autofrettage refers to cold forming with the aim of increasing the fatigue strength by means of internal compressive stresses. By means of autofrettage, an attempt is made to reform a workpiece (for example pipe, vessel) in such a way that compressive stresses remain on an internal side of the workpiece, i.e. they prevail even after the autofrettage. The driving potential for the level of this compressive prestress is the tensile stress difference (or strain difference) between the internal and external regions of the workpiece during the autofrettage.

During the autofrettage, the workpiece is loaded with pressure from within, i.e. starting from the internal side, to be on the yield point or beyond the elastic strain limit (elastic limit), so that a compressive prestress in the material, or material structure, can be generated (after the load is removed). This process may also be referred to as "plasticizing" of the internal wall material. Regions lying further outward, on the other hand, are only elastically deformed. In the state when the load has been removed again, this results in compressive internal stresses especially on the internal wall, in particular since regions lying further outward have only been elastically deformed and try to push back into the original geometry. In this way, a working load amplitude (maximum endurance stress) can be shifted into a noncritical higher pressure range. This is because, after autofrettage has been carried out, a reference internal pressure generates only a smaller strain of the (inwardly prestressed) workpiece inner wall. Crack propagation starting from the internal surface of the workpiece can also be counteracted. The workpieces are thus more robust and operationally reliable. In other words: with the same substance or material, higher loads can be borne. The pressure buildup in this case usually takes place in only a few seconds, i.e. only during a short holding time.

Distinction is made between hydraulic and mechanical autofrettage. In hydraulic autofrettage, high-pressure fluid at pressures far higher than the operating pressure are applied to the workpiece from the inside (in particular for a duration from a few seconds to a few minutes. Hydraulic autofrettage can be used relatively flexibly on different workpiece geometries. In this case, pressures in the range of for example 12000 bar or even 14000 to 15000 bar are produced. Hydraulic autofrettage is, however, relatively elaborate, in particular since a high-pressure supply needs to be provided for each workpiece, and since in many cases finishing is required. The tool components (pump parts, valves, etc.) also need to be configured for the very high pressures required. It is necessary to comply with short maintenance intervals. Hydraulic autofrettage will also be described in detail below in connection with FIG. 1.

The following publications describe individual aspects of hydraulic autofrettage: DE 10 2011 001 763 A1, DE 41 15 284 A1, EP 2 298 940 B1, WO 2016/124660 A1, EP 1 384 534 B1.

In mechanical autofrettage no high-pressure fluid is used in the workpiece, but instead stretching or straining of the workpiece is generated by a die or head with an oversize, which is driven or pressed through the workpiece. The following can be named as advantages of mechanical autofrettage: smoothing of internal surfaces, generation of an accurately shaped internal geometry, dispensability of finishing, generation of a higher degree of deformation or plasticizing than in hydraulic autofrettage, or also more deeply compressive internal stress. The possible effect, or the loading of the workpiece, possible by means of mechanical autofrettage may be increased to the theoretical optimum, which may be described as strain to "full plasticizing". In many cases are, however, groove formation (in particular because of high frictional or surface forces induced by the die) or the requirement for lubricants or special material pairings in order to be able to prevent this groove formation, or the requirement for finishing disadvantageous. Very rapid wear phenomena may also occur on the tool. Mechanical autofrettage will also be described in detail below in connection with FIG. 2.

Thus a need exists for apparatuses and methods having the features described in the introduction, with which autofrettage can be carried out in a way which is as simple and flexible as possible. A need further exists for apparatuses and methods for autofrettage, with which a high-strength workpiece can be produced in a narrow tolerance range, i.e. with high accuracy. Not least, a need exists to minimize any outlay due to finishing of the workpiece by means of an apparatus and a method for autofrettage.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to tools, or tool apparatuses, for the autofrettage of workpieces such as, for instance, machine parts loaded with internal pressure, for example, high-pressure pipes, and to autofrettage methods. The present disclosure further relates to the use of tool apparatuses on the basis of at least two modes of action.

In some examples, a method for the autofrettage of a workpiece may involve arranging a workpiece between a first securing means and a second securing means in particular at least on the second securing means in a fluid-tight manner, and applying high-pressure fluid to an internal volume, formed between the securing means, of the workpiece. A die may be driven into the internal volume through an opening in the first securing means, and, by forward movement of the die, on the one hand a fluid pressure in the internal volume is generated by the die and on the other hand the workpiece is mechanically autofrettaged by expansion by the die. The combination of hydraulic and mechanical autofrettage provides numerous advantages, whether in terms of the strength of the workpiece or in terms of the range of application. The fluid pressure can be maintained by means of the die, and the workpiece can thereby be prestrained.

It has been found that the hydromechanical autofrettage of the invention may be used particularly in a pressure range of from 4000 to 20000 bar. For example, HFC fluids may be used as high-pressure fluids (water-glycols with a water content of more than 35% and polyglycol solution).

The forward movement of the die may, in particular, be carried out or controlled by means of a hydraulic drive.

The securing means may, for example, be configured in the manner of a (screw) flange. A flange is to be understood according to the present disclosure as a machine element for holding and securing and optionally also sealing at least one side/surface of the workpiece. The terms flange and securing means will be used synonymously below. The securing means may be formed by a flange or comprise a flange. The first securing means may therefore also be described as an introduction-side securing means or introduction-side flange, and the second securing means may be described as a bottom-side securing means or bottom-side flange, in the case of a support on the bottom. Optionally, clamping in a tool without support on the bottom is also possible.

According to one embodiment, the forward movement of the die is carried out in such a way that high-pressure fluid is pressed through between a head of the die and the workpiece and flows away along the die in the direction of the first securing means, or the first flange. In this way, lubrication may be carried out and the mechanical effect on the workpiece is less disadvantageous than in the case of purely mechanical autofrettage. Lubrication between the head and the workpiece may in this case, in particular, be reduced to the lubricating effect of very small fluid inclusions in the surface structure of the workpiece, with the result that the internal pressure can be adjusted indirectly by means of the forward movement rate and the outflow of the high-pressure fluid. It has been found that a reproducible method which is very easy to control, is operationally reliable and can be carried out precisely can be provided in this way. The pressure in the internal volume may in particular be set by means of the die, it also being possible to set the pressure level substantially independently of the forward movement rate. Accordingly, this manner of forward movement is not to be understood as dynamic autofrettage of the type described, for example, in DE 10 2011 001 763 A1.

The die may comprise a head with an oversize relative to the internal dimension of the workpiece, or it may be connected to the head.

In dynamic autofrettage (for example according to DE 10 2011 001 763 A1), the autofrettage pressure is adjusted essentially by means of the die speed. In contrast thereto, although the forward movement may be used according to the invention for pressure generation, the pressure level (magnitude) may however be defined substantially independently of the forward movement rate, and in particular substantially constantly in a range of from minimum to maximum speed. In particular, the pressure-induced widening is determined only by an oversize of the head.

According to one embodiment, a/the head of the die is moved forward until it enters a high-pressure proof recess in the second flange, in particular a blind-hole bore. This provides possibilities of variation in relation to the nature in which the increased internal pressure is generated. In particular, in this case the autofrettage may be carried out with an at least approximately constant effect as far as the lower end of the workpiece. In this way, in particular, it is also possible to adjust the same process conditions along the entire workpiece.

Preferably, the recess is dimensioned in such a way that an oversize region of a head of the die can be received. The recess may be configured and dimensioned in a way which corresponds geometrically to the head. Advantageously, there is enough play between the head and the recess so that the apparatus can be relieved of pressure automatically at the end of the process.

According to one embodiment, the internal volume is filled pressurelessly with high-pressure fluid before the die is moved forward into the internal volume. This also provides advantages in relation to setting up the tool before the autofrettage is carried out. Sealing can be ensured in a straightforward way.

The arrangement between the first and second securing means does not necessarily require sealing at the first securing means, but if at all only at the second securing means. Only at the second securing means do high fluid pressures occur, which can be controlled and regulated better in the case of sealing, while the high-pressure fluid may also for example be pumped off at the first securing means. At the first securing means, it is also not necessarily required to withstand high loads, or pressure forces. The first and second securing means may therefore be configured and dimensioned entirely independently of one another. The second securing means may also be referred to as a bottom-side counter-support.

In the upper flange (top flange), there is not necessarily a high pressure, in particular since sufficient play may be adjusted both between the die and the top flange and between the die, or head, and the workpiece. In this way, the tool apparatus can be kept simple in structure.

Before the filling with high-pressure fluid, the internal volume may be sealed in a pressure-tight manner on one side at one flange. Pressure-tight sealing of the other side (i.e. of the other flange) is not necessarily required since the high-pressure fluid can be kept under pressure by the head moving in, so that a high-pressure zone is formed only in the region from the head to the second flange. Above the head (i.e. in the region from the head to the first flange) a pressureless zone may be formed.

According to one embodiment, high pressure is built up by forward movement of the die. This also allows a simple pressure regulation as a function of the die position. Optionally, the forward movement may be adjusted in such a way that pressure regulation takes place in a self-regulating fashion by flow of high-pressure fluid out past a head of the die. This provides a very operationally reliable method, in particular at extremely high pressures of more than 15000 bar.

In this case, a pressure-induced widening may be defined substantially by an oversize of the die, in particular independently of the forward movement rate. For example, this allows variation of the forward movement rate without pressure variation.

Preferably, the forward movement of the die is adjusted in such a way that a strain of the workpiece causes high-pressure fluid to flow from the internal volume past a head of the die. In this way, a self-regulating process with high operational reliability and low error tolerance can be provided.

According to one embodiment, high-pressure fluid is extracted from the first flange as a function of the forward movement of the die on the rear side of a head of the die. In this way, the management of high-pressure fluid can be concentrated onto the first flange. The second flange merely needs to be connected fluid-tightly the workpiece. Fluid-tight sealing at the first flange or at the first securing means may optionally be omitted.

According to one embodiment, a fluid pressure in the internal volume is built up from the outside at the second flange after introduction of the die, or head, into the workpiece, in particular at the start of the forward movement of the die. This may be carried out by means of a pressure-generating device (in particular a pump) connected from the outside (for example through a bore) of the second flange. This variant of the method may provide advantages when, in particular, a transition phase due to any compressibility of the high-pressure fluid before reaching the full fluid pressure is intended to be reduced.

According to one embodiment, the fluid pressure is adjusted to a defined value, below the pressure level resulting because of the forward movement of the die, by means of a pressure limiter connected to the second flange. In this way, the method can be adjusted in a very flexible way to a definable ratio between the modes of action of mechanical autofrettage and hydraulic autofrettage. It has been found that the possibility can be provided in this way of fully exploiting the autofrettage process up to so-called full plasticizing of the workpiece. In this case, for example, pressure peaks can also be avoided, for example if unexpectedly high friction forces were to act at the interface between the head and the workpiece.

According to one embodiment, the method described above is used for the autofrettage of a workpiece from the group: pump body, in particular up to a ratio of length to bore diameter of 15, fittings or pipe connectors, sealing lenses, valve seats, tubular parts or pressure-bearing bores, in particular up to a ratio of length to bore diameter of 20.

According to one embodiment, the fluid pressure for the hydraulic autofrettage is generated by means of the die, wherein the workpiece is mechanically autofrettaged by means of a head of the die with an oversize relative to the internal dimension of the workpiece. The oversize may define the widening.

At least one of the objects described above is also achieved according to the invention by a method for the autofrettage of a workpiece, the workpiece being arranged between a first flange and a second flange, high-pressure fluid being applied to an internal volume, formed between the flanges, of the workpiece, wherein a die is driven into the internal volume through an opening in the first flange, and wherein, by forward movement of the die, on the one hand a fluid pressure in the internal volume is generated by the die and on the other hand the workpiece is mechanically autofrettaged, the forward movement of the die being carried out in such a way that high-pressure fluid is pressed through between a head of the die and the workpiece and flows away along the die in the direction of the first flange, the forward movement of the die being adjusted in such a way that a strain of the workpiece causes high-pressure fluid to flow from the internal volume past the head of the die. In this way, the advantages described above can be achieved.

Furthermore provided is an autofrettage tool apparatus for the autofrettage of a workpiece, comprising a first flange, or a first securing means, and a second flange, or a second securing means, between which an internal volume of the workpiece can be arranged, in particular fluid-tightly at least on the side of the second flange, into which internal volume a high-pressure fluid can be introduced.

At least one of the objects described above is achieved according to the invention in that the autofrettage tool apparatus comprises a die adapted for mechanical autofrettage of the workpiece, the first securing means comprising an opening for the die, the autofrettage tool apparatus being adapted for hydromechanical autofrettage of the workpiece by means of the high-pressure fluid and the die. With this arrangement and guiding of the die, numerous advantages are obtained, whether in terms of the range of application of the method or in terms of a simple and robust structure of the tool apparatus.

The workpiece may be clamped by means of a flange screen or equivalent clamping means between the flanges, such as is allowed by means of high-pressure technology. In this case, sealing may also be ensured.

According to one exemplary embodiment, the opening is arranged flush, in particular coaxially, with a longitudinal axis of the workpiece. In this way, the die can be guided linearly, in particular unidirectionally, which simplifies the method of the apparatus.

According to one exemplary embodiment, the second flange comprises a recess which is arranged flush, in particular coaxially, with a longitudinal axis of the workpiece. In this way, the die can be guided linearly, in particular unidirectionally, which simplifies the method of the apparatus. The recess may be arranged and dimensioned in such a way that the recess is adapted to receive a free end of the die. The second flange may in this case be arranged and dimensioned in such a way that the second flange is adapted to absorb and transmit die forces during the autofrettage.

According to one exemplary embodiment, a/the head of the die is fastened dismountably on the die or is mounted without any particular fastening on the end side in front of the die. This provides various advantages, whether in terms of specifically selectable material pairings or in terms of dismounting of the workpiece after autofrettage has been carried out.

According to one exemplary embodiment, the recess of the second flange is configured as a high-pressure proof recess for high-pressure fluid or for a head of the die. This provides advantages in terms of the method management (in particular, isolation of pressure variations), and also in terms of the workpieces which can be strengthened by means of the method. In particular, the die may be displaced fully along the internal surface of the respective workpiece.

Securing in terms of safety rules may be carried out by means of the flange screw connections, or by means of pressure-limiting additional apparatuses, for example by means of a pressure limitation valve or a rupture disk unit.

According to one exemplary embodiment, a/the head of the die comprises a front-side chamfer and a rear-side chamfer, between which chamfers a lateral surface which is cylindrical or becomes conically wider toward the rear is formed. In this way, the head can be configured specifically, in particular specifically for a respective workpiece or workpiece material. In particular, individual surface sections of the head may be provided with different surface properties or surface geometries.

The head preferably has a high hardness and a high surface quality. The head may be subjected to a special surface treatment, or comprise a special coating. In this way, susceptibility to cold welding/seizing can be reduced.

The head and the die are preferably two different parts. This allows specific configuration of the head, especially in terms of particular material pairings or workpiece sizes, without having to change the die. As an alternative, the head and the die may also be integrally combined to form one component.

According to one exemplary embodiment, the second flange is solid. This provides a high strength and makes it possible to absorb and transmit forces by means of the second flange. The second flange may at the same time be used as a foundation for the tool apparatus as a whole.

According to one exemplary embodiment, the second flange comprises a lower side adapted for support of the tool apparatus and for the transmission of die forces. In this way, with a simple design structure, the tool apparatus can straightforwardly be mounted and supported.

According to one exemplary embodiment, an intermediate element arranged geometrically with respect to the die is arranged in the first flange. The workpiece may be preceded by an intermediate element, in particular a fitting bush, through which the head is driven first. In this way, a transition phase due to compressibility of the high-pressure fluid before reaching the full fluid pressure can be substantially bridged until the head reaches the workpiece.

At least one of the objects described above is also achieved according to the invention by an autofrettage tool apparatus for the autofrettage of a workpiece, comprising a first flange and a second flange, between which an internal volume of the workpiece can be arranged, in particular fluid-tightly at least on the side of the second flange, into which internal volume a high-pressure fluid can be introduced, the autofrettage tool apparatus comprising a die adapted for mechanical autofrettage of the workpiece, the first flange comprising an opening for the die, the autofrettage tool apparatus being adapted for hydromechanical autofrettage of the workpiece by means of the high-pressure fluid and the die, the opening being arranged coaxially with a longitudinal axis of the workpiece, the second flange comprising a recess which is arranged coaxially with the longitudinal axis of the workpiece, the recess being configured as a high-pressure proof recess for high-pressure fluid or for a head of the die. In this way, the advantages described above can be achieved. In this case, an intermediate element formed geometrically with respect to the die may be arranged in the first flange.

According to one exemplary embodiment, the die comprises a/the head with an oversize relative to the internal dimension of the workpiece, adapted for mechanical autofrettage of the workpiece.

At least one of the objects described above is also achieved according to the invention by a control device having a logic unit, adapted for controlling a method according to the invention and/or an autofrettage tool apparatus according to the invention, wherein the control device comprises at least one drive and a measuring device comprising at least one sensor, the drive being drivable as a function of measurement values recorded by the measuring device, in particular pressure, force and/or distance. This provides a possibility of automating the method to a high degree and avoiding error sources. The control device may comprise a data memory with data relating to materials and workpiece geometries, on the basis of which data particular setpoint values for the aforementioned parameters can be predefined and can be specified as minimum or maximum threshold values. The control device may furthermore be in communication from the outside with at least one pump or comparable device for applying a fluid pressure in the internal volume.

For example, the fluid pressure during the autofrettage process is monitored and logged by means of a pressure measuring apparatus connected to the second flange.

At least one of the objects described above is also achieved according to the invention by use of an autofrettage tool apparatus, in particular of an autofrettage tool apparatus according to the invention, for the autofrettage of a workpiece, in particular of a workpiece from the group: pump body, in particular up to a ratio of length to bore diameter of 15, fittings or pipe connectors, sealing lenses, valve seats, tubular parts or pressure-bearing bores, in particular up to a ratio of length to bore diameter of 20; both mechanically by means of a die and hydraulically by means of high-pressure fluid, in particular simultaneously mechanically and hydraulically. This provides the advantages already mentioned above.

Figure 1:
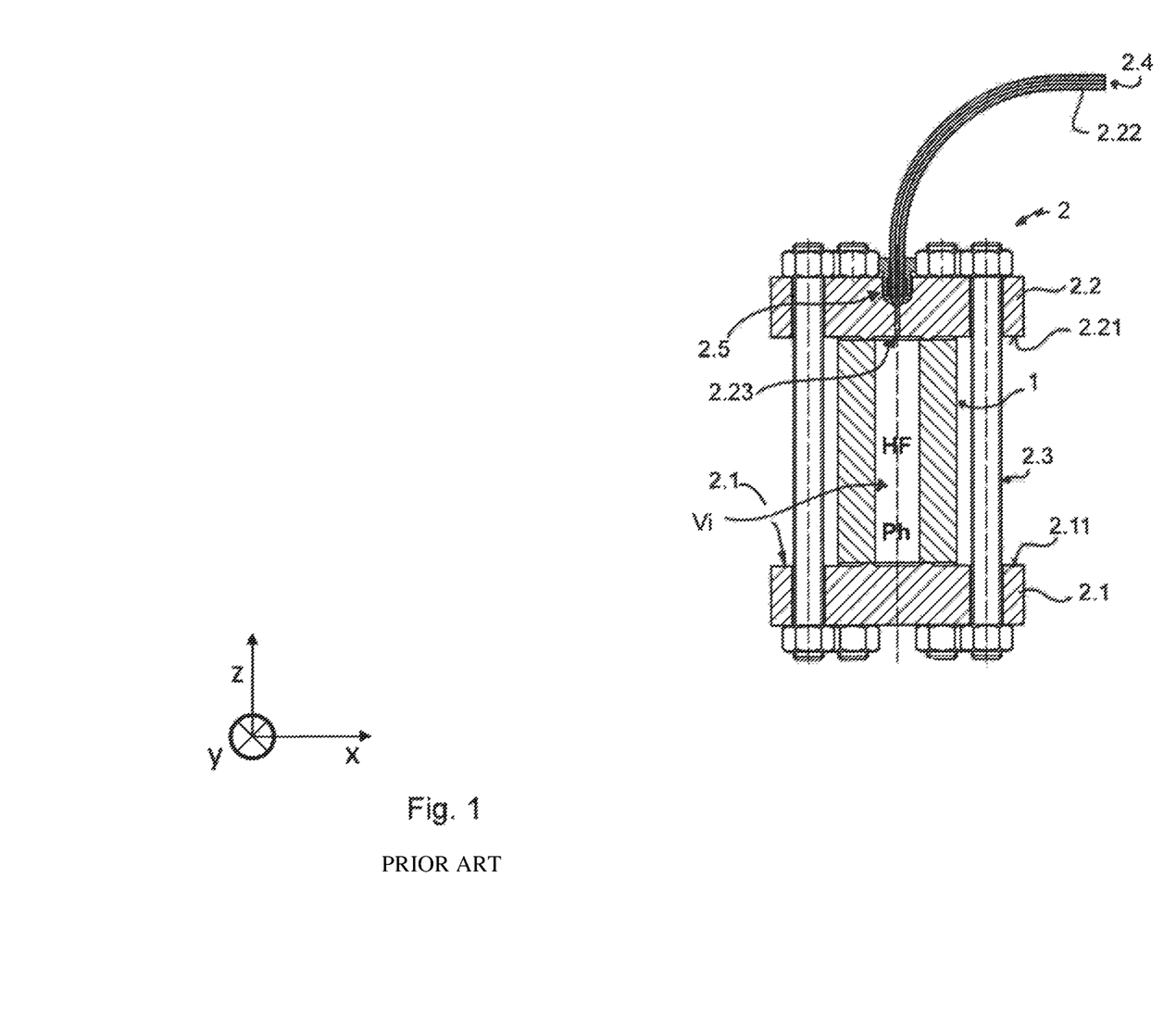
FIG. 1 is a sectional view of an arrangement of a workpiece in a tool according to previously known purely hydraulic autofrettage.

FIG. 1 shows a workpiece 1 which is clamped in a tool 2 for hydraulic autofrettage between a bottom-side flange 2.1 and a top-side flange 2.2, respectively on internal end sides 2.11, 2.21 by means of clamping screws 2.3. A supply line 2.22 for high-pressure fluid HF is coupled by means of a high-pressure proof coupling 2.5 to the upper side of the top-side flange 2.2. Through a pressure connection 2.4, high-pressure fluid HF can be introduced via an opening, formed in particular as a relatively thin small bore, in the top-side flange 2.2 into an internal volume Vi bounded by the workpiece 1.

The functionality of this tool 2 may be described as follows: the workpiece 1 is placed in the tool 2 and clamped therein. In this case, or in a separate step, the high-pressure supply 2.4, 2.5 needs to be set up. The workpiece 1 is thereupon exposed to a hydraulic autofrettage pressure Ph, which is to be defined specifically for each workpiece. Very high pressures of up to around 14000 bar are conventional. Such high pressures necessitate relatively short maintenance intervals, and it is necessary to comply with stringent safety requirements. The hydraulic components (in particular pumps, pipelines, valves) are cost-intensive special parts.

In order to achieve high geometrical accuracies, or narrow dimensional tolerances, in many cases finishing is carried out. The manufacturing tolerances may also be improved by monitoring the deformation during the pressure buildup, in particular by means of strain gauges.

Figure 2:
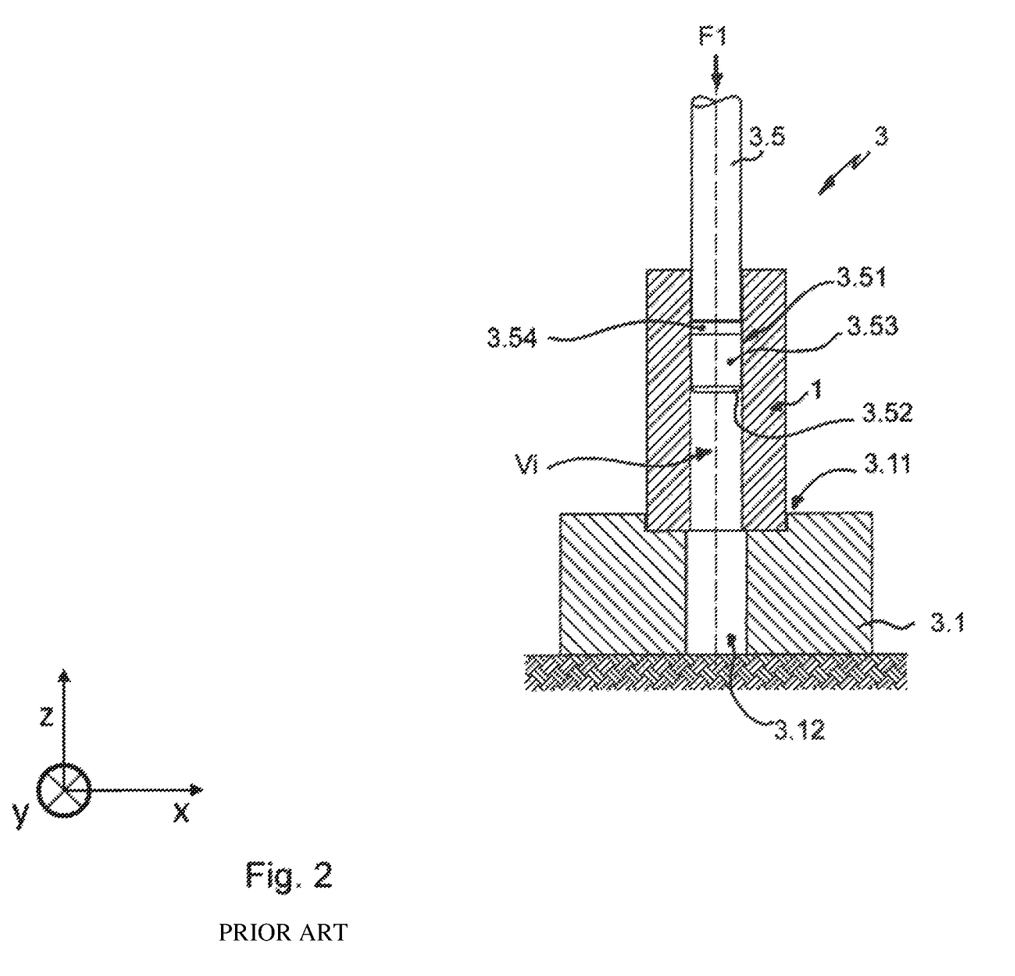
FIG. 2 is in sectional view of an arrangement of a workpiece in a tool according to previously known purely mechanical autofrettage.

FIG. 2 shows a workpiece 1 which is arranged in a tool 3 for mechanical autofrettage between a support section 3.11 of a baseplate 3.1 and a die 3.5. An internal volume Vi bounded laterally/radially by the workpiece 1 is arranged flush, or coaxially, with a recess 3.12 in the baseplate 3.1. The die comprises a free end 3.51, particularly in the manner of a head, which is defined in the longitudinal direction/forward movement direction of the die by a front-side chamfer 3.52 and a rear-side chamfer 3.54, between which chamfers a lateral surface 3.53 is formed.

The functionality of this tool 3 may be described as follows: the die 3.5 is driven with a force F1 through the internal volume Vi of the workpiece 1 arranged stably on the baseplate 3.1, until the free end 3.51 reaches the recess 3.12. After this, the workpiece 1 has an internal geometry at least approximately corresponding to that of the free end 3.51, in particular a cylindrical internal geometry.

Figure 3:
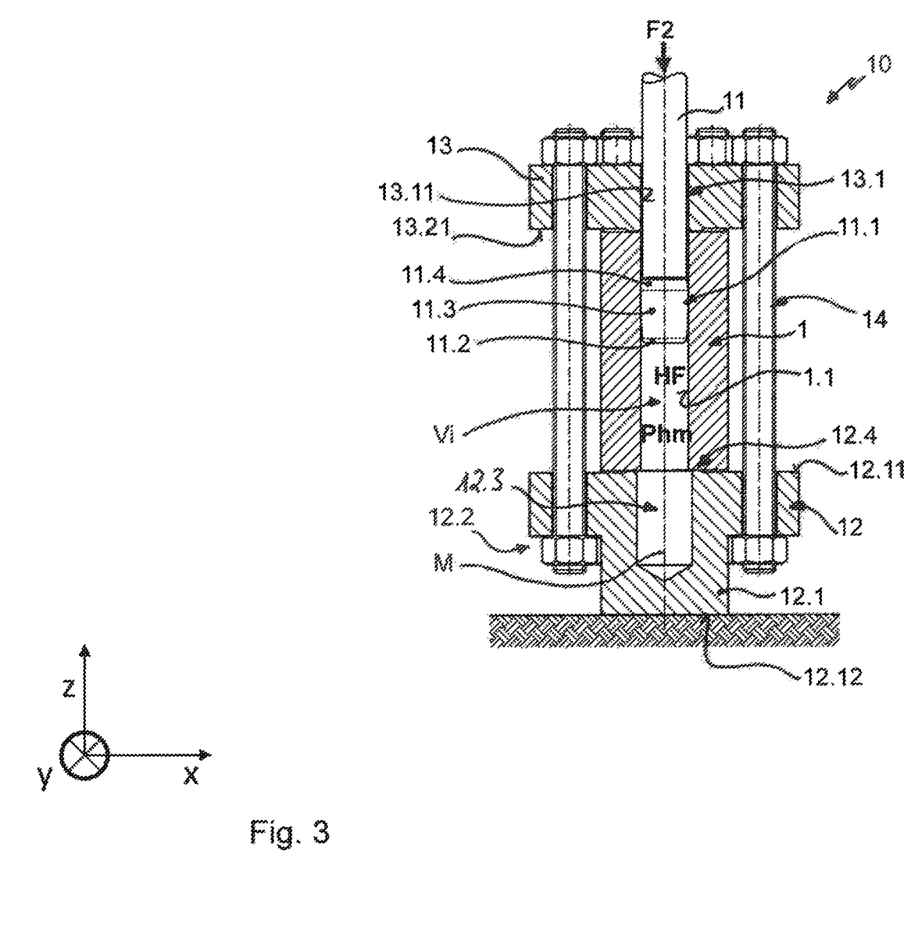
FIG. 3 is a sectional view of an arrangement of a workpiece in an example hydromechanical autofrettage tool.

FIG. 3 shows a workpiece 1, for example a cylindrical pressure vessel or high-pressure pipe, which is clamped in a hydromechanical autofrettage tool apparatus 10 between a bottom-side base flange 12 and a top-side flange 13, respectively on internal end sides by means of a flange screw connection 14 comprising clamping screws or the like. The base flange 12 comprises a foundation 12.1 and a shoulder 12.2. An internal volume Vi bounded laterally/radially by the workpiece 1 is arranged flush, or coaxially, with a high-pressure proof recess 12.3 in the base flange 12. The recess 12.3 is, in particular, configured as a blind hole (blind-hole bore). The recess 12.3 has internal dimensions, or an internal diameter, which is/are somewhat greater than the external dimensions, or an external diameter, of the die 11. At the bottom, the base flange 12 is solid and not open. The base flange 12 may for example comprise a circular lower side 12.12, which is adapted in particular as a support surface for the tool apparatus 10 as a whole, i.e. in order to absorb and transmit die forces.

The top-side flange 13 comprises an opening 13.1, the internal lateral surface 13.11 of which may be configured geometrically correspondingly to a die 11 of the tool apparatus 10, in particular cylindrically. The opening 13.1 has internal dimensions, or an internal diameter, which is/are somewhat greater than the external dimensions, or an external diameter, of the die 11. The die 11 comprises a free end 11.1, particularly in the manner of a head, which is defined in the longitudinal direction/forward movement direction of the die by a front-side chamfer 11.2 and a rear-side chamfer 11.4, between which chamfers a lateral surface 11.3 is formed.

The tool apparatus 10 extends in the forward movement direction of the die along a longitudinal midaxis M, in particular a symmetry axis. High-pressure fluid HF can be introduced into the internal volume Vi, which is in particular cylindrical.

The functionality according to the invention of this tool apparatus 10 according to the invention may now be described in detail as follows, in which case three successive steps may be highlighted:

The workpiece 1 is arranged in a first step S1 on the base flange 12, flush or coaxially with the blind-hole bore or depression 12.3, while being closed or sealed in a pressure-tight fashion, in particular both at a circumferential sealing means 12.4, for example a sealing ring or a circumferential elevation or a circumferential web on an internal end side 12.11 of the base flange 12, and on an internal end side 13.21 of the top-side flange 13. This may be carried out by clamping the base flange 12 with the top-side flange 13. In this case, the tool 1 is arranged in the tool apparatus 10 in such a way that the internal volume Vi bounded by the workpiece 1 respectively continues in the opening 13.1 and in the recess 12.3. The opening 13.1, the recess 12.3 and the internal volume Vi bounded by the workpiece 1 this case form three internal volumes arranged flush, in particular coaxially in a row.

The sealing system or sealing means 12.4 is schematically represented by way of example for seals or sealing systems allowed or suitable for high-pressure technology.

Then, in a second step S2, the internal volume Vi bounded by the workpiece 1 and the flanges 12, 13 is filled with high-pressure fluid HF. In this case, it is not yet necessary to build up a high-pressure. A high-pressure connection may be obviated.

The filling with high-pressure fluid HF may be carried out in such a way that high-pressure fluid HF is present not only in the recess 12.3 and in the internal volume Vi but also in the internal volume defined by the opening 13.1. The volume of high-pressure fluid HF used may thus be significantly greater than the internal volume Vi bounded by the workpiece 1.

In a subsequent third step S3, the die 11, or the head 11.1, is driven through the internal volume Vi of the workpiece 1, particularly in such a way that the following effect is then generated: the high-pressure fluid HF escapes upward, or towards the rear of the head 11.1 on the rear side behind the head 11.1, between the head 11.1 and the internal wall or internal lateral surface 1.1 of the workpiece 1. High-pressure fluid HF can flow past the head 11.1 as soon as a certain internal pressure has been built up. This may take place as a function of a predetermined forward movement rate. The die 11 is in this case moved forward with a die force F2 which is predefined for hydromechanical autofrettage or continuously adjusted, and a hydromechanical autofrettage pressure Phm which is predefined for hydromechanical autofrettage or continuously adjusted is set up in the internal volume Vi. The die 11 can be moved forward as far as the recess 12.3, in particular until the rear-side chamfer 11.4 is moved into the recess 12.3.

The depth of the recess 12.3 is to this end at least as large as the length of the free end 11.1, in particular as the length of an oversize of the free end 11.1.

Advantages achievable by means of hydromechanical autofrettage may again be summarized as follows:

The method can be carried out in a self-regulating fashion, since with an increasing internal pressure the amount of high-pressure fluid flowing away can increase. Friction forces between the head and the internal wall can be avoided, in particular since the high-pressure fluid can in this case undertake a lubricant function. In this case, the high-pressure fluid may also be pressed into the surface structure of the workpiece. A rear-side section of the head may finally smooth and compress the surface. It has been found that a high degree of surface quality can be achieved by means of the high-pressure fluid flowing past in combination with a high surface pressure. Grooves can be prevented. In particular, finishing of the internal surface(s) is also no longer necessary because of this. A precise, dimensionally compliant, internal contour can be produced in a very narrow tolerance range. Plasticizing, or internal strain, of the workpiece can also take place to a higher degree than in the case of hydraulic autofrettage, in particular at least approximately as far as "full plasticizing". Not least, the tool apparatus, in particular the head, may be operated/used over a longer lifetime or service life, than in the case of mechanical autofrettage.

Figure 4:
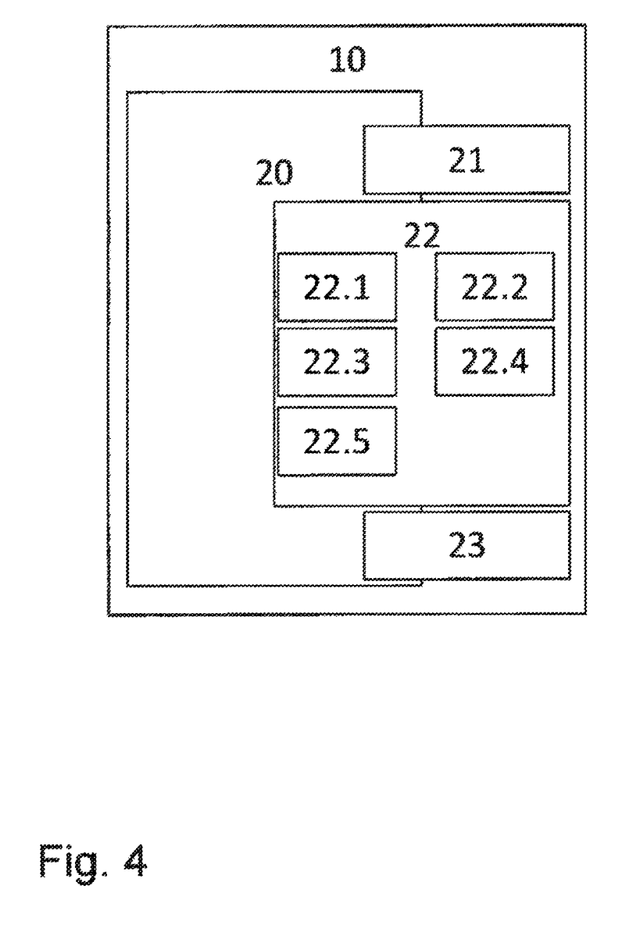
FIG. 4 is a schematic view of additional components of an example hydromechanical autofrettage tool apparatus.

FIG. 4 describes a control device 20, by means of which the tool apparatus 10 according to the invention can be operated, in particular through some or all of the method steps according to the invention. The drive 21 delivers a forward-movement or die force F2. The drive 21 may also comprise a pump for introducing or pumping off hydraulic fluid. A measuring device 22, which is in communication with a logic unit 23 of the control device 20, comprises a plurality of sensors, in particular at least one pressure/force sensor 22.1 (which is/are for example on or in the base flange 12), at least one position sensor 22.2 for the (instantaneous) position of the die (which is/are for example on or in the top-side flange 13), at least one measuring unit 22.3 for the forward movement rate, at least one force sensor for the die force 22.4, at least one flow sensor 22.5. All the sensors may record measurement values, and deliver them to the logic unit, during the method according to the invention.

The components shown in FIG. 4 may, for example, be provided in a tool apparatus according to the exemplary embodiment described in FIG. 3.

Figure 5:
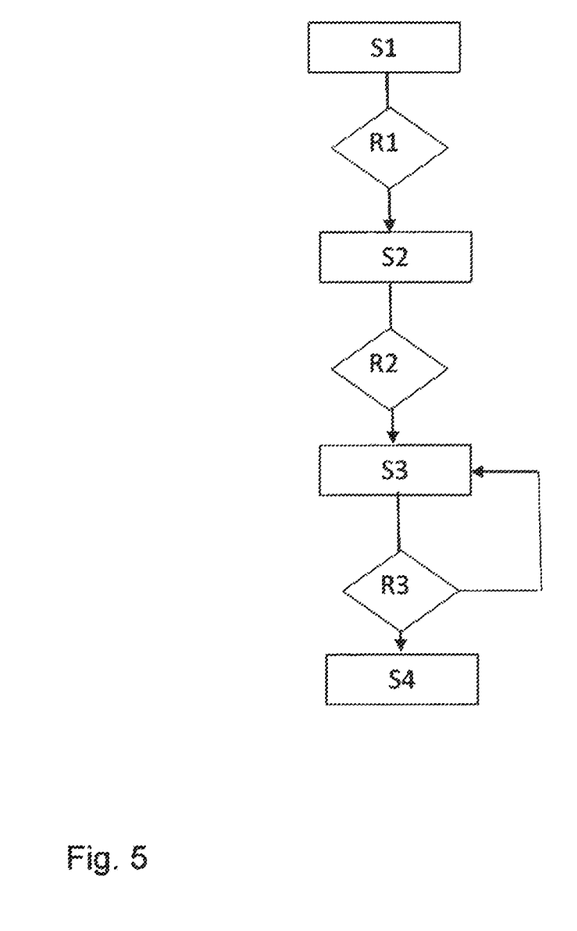
FIG. 5 is a schematic view depicting steps of an example method of the present disclosure.

Individual method steps are described in detail in FIG. 5: in the first step S1, the tool is arranged in the tool apparatus. At a first control/regulation point R1, a prestress force, by means of which the workpiece is clamped and thereby sealed in relation to predefinable overpressures, may be monitored or adjusted. In the second step S2, high-pressure fluid is introduced into the internal volume of the workpiece. At a second control/regulation point R2, the amount of high-pressure fluid introduced may be adjusted or monitored, in particular on the basis of measurement values of a flow sensor, which may for example be arranged on a feed line to the internal volume. In the third step S3, a die is driven through the internal volume of the workpiece. At a third control/regulation point R3, in particular the pressure in the internal volume and/or the forward movement rate of the die may be monitored or adjusted.

In a fourth step S4, the die 11, or the head, may be positioned in a recess 12.3, particularly in such a way that the free end 11.1 is decoupled from the workpiece 1. The tool apparatus 10 may then be dismounted and the workpiece 1 may be removed. Optionally, the high-pressure fluid HF is in this case can be pumped off before the dismounting. In this case, the die without the head may be drawn back through the workpiece. The die may thus initially be moved back again, in particular counter to the forward movement direction/axis (z), in particular fully out from the workpiece 1, before the tool apparatus 10 is dismounted.

One of the possible configurations of the method will be described again in summary below.

After the actual autofrettage process is ended, the die without the head is drawn out the workpiece, or out from the corresponding component of the tool apparatus. The head in this case remains in the recess. The workpiece is then taken out of the tool apparatus, which may for example be arranged in a hydraulic press or at least comprises parts thereof. The head is then removed from the recess. The mounting for a further untreated workpiece is then carried out. With a view to large production runs, it may be particularly advantageous to operate a plurality of tool apparatuses or a plurality of heads, in parallel.

Figure 6:
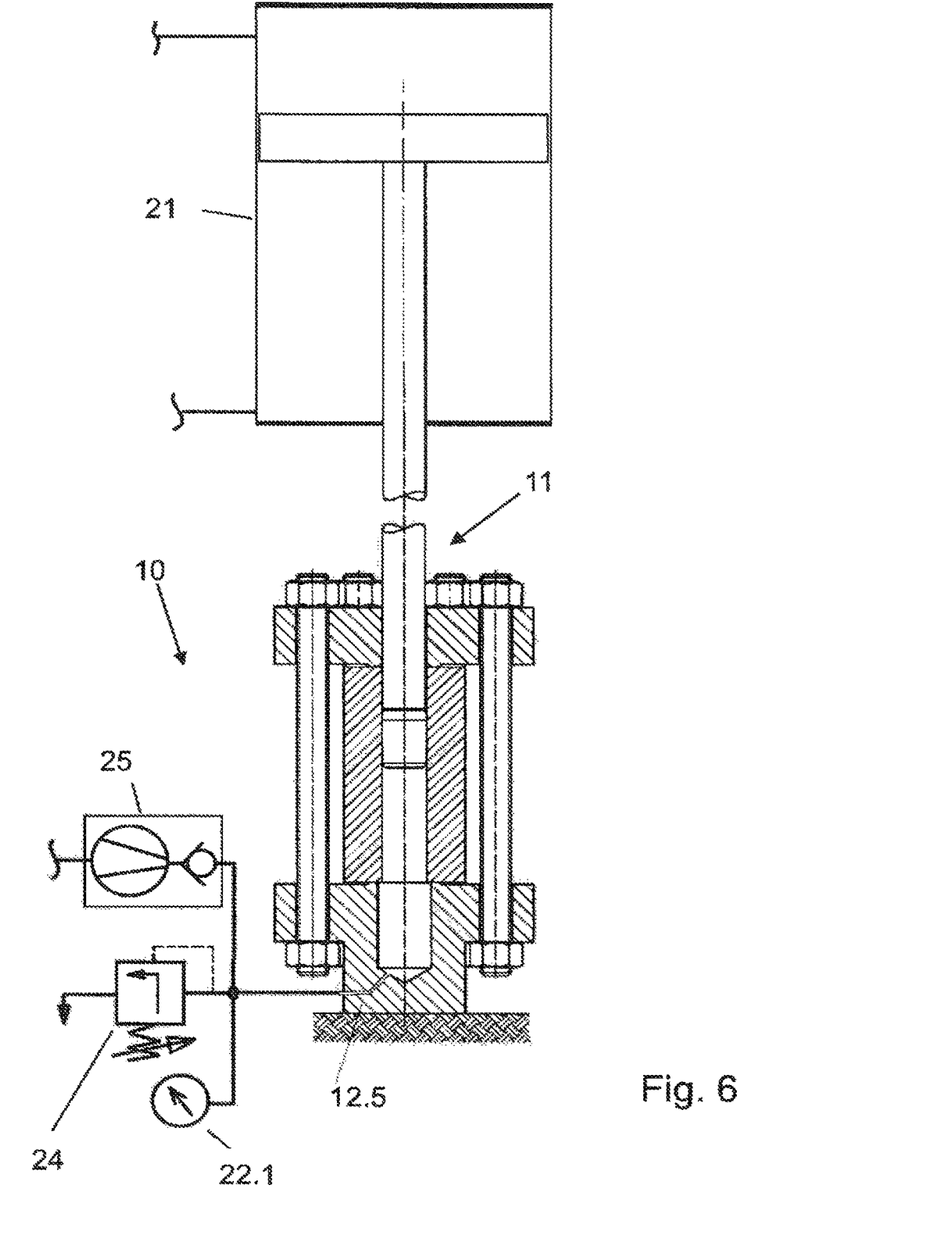
FIG. 6 is a sectional view of an arrangement of a workpiece in an example hydromechanical autofrettage tool apparatus.

FIG. 6 shows a hydromechanical autofrettage tool apparatus 10 which, in addition to the components described above, also comprises a high-pressure line 12.5 outward, here configured as a bore in the foundation 12.1. By means of a pressure limiter 24 and an external device for pressure generation, in particular a pump 25, pressure regulation may be carried out from the outside, in particular periodically in addition to the pressure regulation by means of the forward movement of the die. To this end, one or more pressure sensors 22.1 may be provided on the outside.

Figure 7A:
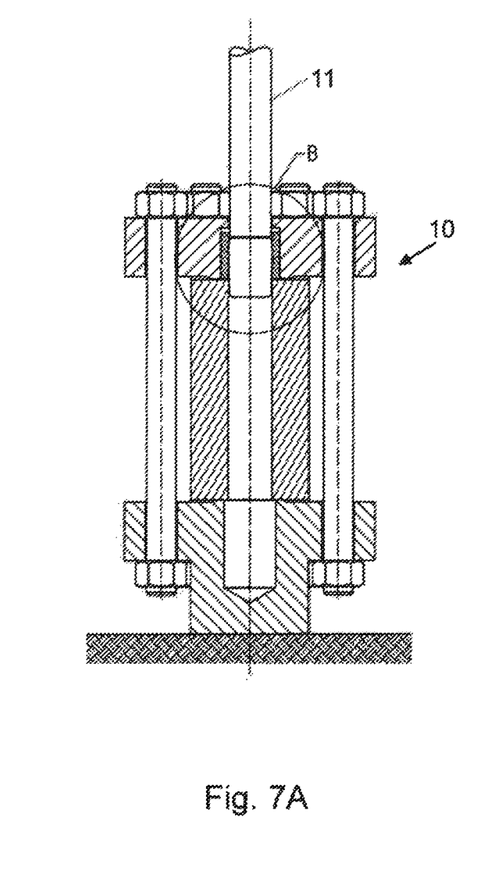
FIG. 7A is a sectional view of a first flange of an example hydromechanical autofrettage tool apparatus.
Figure 7B:
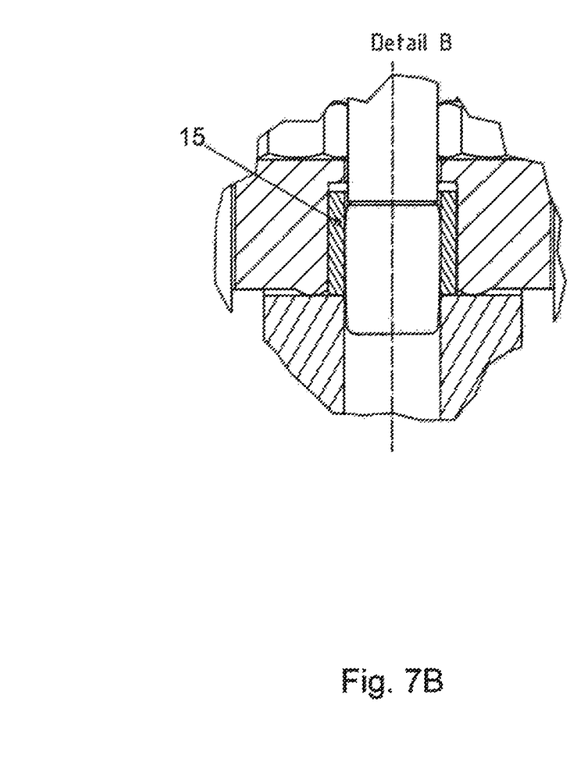
FIG. 7B is a detailed view of the first flange of the example hydromechanical autofrettage tool apparatus of FIG. 7A.

FIGS. 7A, 7B show a hydromechanical autofrettage tool apparatus 10 which, in addition to the components described above, also comprises an intermediate element 15, in particular configured as a fitting bush. The intermediate element 15 is arranged in a geometrically corresponding recess in the first flange 13 and bears on the workpiece 1. The intermediate element 15 and the head form a press-fit, with the effect that high pressure can already be built up in the section above the workpiece 1. The accuracy of the method can thereby be improved. The desired high pressure may be built up immediately, i.e. even before the head comes in contact with the workpiece 1.

LIST OF REFERENCES 1 workpiece, for example cylindrical pressure vessel or high-pressure pipe
1.1 internal wall, or internal lateral surface
2 previously known tool for hydraulic autofrettage
2.1 bottom-side flange
2.11 internal end side
2.2 top-side flange
2.21 internal end side
2.22 supply line for high-pressure fluid
2.23 opening for high-pressure fluid
2.3 clamping screw
2.4 pressure connection for high-pressure fluid
2.5 high-pressure proof coupling of the supply line
3 previously known tool for mechanical autofrettage
3.1 baseplate
3.11 support
3.12 recess
3.5 die
3.51 free end of the die, in particular head
3.52 front-side chamfer
3.53 lateral surface
3.54 rear-side chamfer
10 hydromechanical autofrettage tool apparatus
11 die, in particular cylindrical
11.1 free end of the die, in particular head
11.2 front-side chamfer of the free end
11.3 lateral surface of the free end
11.4 rear-side chamfer of the free end
12 second securing means, in particular bottom-side base flange
12.1 foundation
12.11 internal end side
12.12 lower side, in particular support surface
12.2 shoulder
12.3 recess, in particular blind hole (blind-hole bore)
12.4 sealing system or sealing means
12.5 high-pressure line outward, in particular bore in the foundation
13 first securing means, in particular introduction/top-side flange
13.1 opening geometrically corresponding to the die
13.11 internal lateral surface of the opening
13.21 internal end side
14 fastening of the securing means, in particular flange screw connection 15 intermediate element, in particular fitting bush
20 control device
21 drive
22 measuring device
22.1 pressure/force sensor
22.2 position sensor
22.3 measuring unit, in particular for speed
22.4 force sensor for die force
22.5 flow sensor
23 logic unit
24 pressure limiter
25 external device for pressure generation, in particular pump
F1 die force, purely mechanical
F2 die force, hydromechanical
HF high-pressure fluid
M longitudinal midaxis, in particular symmetry axis
Ph hydraulic autofrettage pressure
Phm hydromechanical autofrettage pressure
R1 control/regulation point relating to a prestress force
R2 control/regulation point relating to the amount of high-pressure fluid introduced
R3 control/regulation point relating to the pressure in the internal volume and/or relating to the forward movement rate of the die
S1 step of arranging the workpiece in the tool apparatus
S2 step of introducing high-pressure fluid into the internal volume of the workpiece
S3 step of driving a die through the internal volume of the workpiece
S4 step of positioning the die
Vi internal volume
x, y, z width direction, depth direction and height direction

What is claimed is:

1. A method of autofrettage comprising:
   positioning a workpiece between a first securing means and a second securing means;
   applying fluid to an internal volume of the workpiece formed between the first securing means and the second securing means;
   driving a die into the internal volume through an opening in the first securing means, wherein the die is driven into the internal volume such that fluid is pressed between a head of the die and the workpiece and flows along the die in a direction of the first securing means; and
   by movement of the die, generating a fluid pressure in the internal volume and mechanically autofrettaging the workpiece.

2. The method of claim 1 wherein the die is driven until the die enters a recess in the second securing means.

3. The method of claim 1 comprising filling the internal volume with fluid before the die is driven into the internal volume.

4. The method of claim 1 wherein a fluid pressure for hydraulic autofrettage is generated by way of the die, wherein the workpiece is mechanically autofrettaged by way of a head of the die that is oversized relative to an internal dimension of the workpiece.

5. A method of autofrettage comprising:
   positioning a workpiece between a first securing means and a second securing means;
   applying fluid to an internal volume of the workpiece formed between the first securing means and the second securing means;
   driving a die into the internal volume through an opening in the first securing means; and
   by movement of the die, generating a fluid pressure in the internal volume and mechanically autofrettaging the workpiece,
   wherein a pressure-induced widening of the workpiece that results from the movement of the die depends on a size of the die, wherein the pressure-induced widening of the workpiece is independent of a rate at which the die is driven.

6. The method of claim 5 comprising controlling the movement of the die such that a strain of the workpiece causes fluid to flow from the internal volume past a head of the die.

7. The method of claim 5 comprising at least one of:
   building up the fluid pressure in the internal volume after introducing the die into the workpiece; or
   adjusting the fluid pressure in the internal volume to a defined value, which is below a pressure level that results due to the movement of the die, by way of a pressure limiter connected to the second securing means.

8. An autofrettage tool apparatus for autofrettage of a workpiece, the autofrettage tool apparatus comprising:
   a first securing means that includes an opening;
   a second securing means, wherein an internal volume of the workpiece is positionable between the first securing means and the second securing means, wherein the internal volume of the workpiece is configured to receive fluid; and
   a die configured for mechanical autofrettage of the workpiece, wherein the die is configured to be positioned in the opening of the first securing means,
   wherein the autofrettage tool apparatus is configured for hydromechanical autofrettage of the workpiece by way of fluid and the die,
   wherein at least one of:
   a head is detachably fastened on the die or is mounted on an end side in front of the die; or
   a head of the die comprises a front-side chamfer and a rear-side chamfer, wherein between the front-side chamfer and the rear-side chamfer a lateral surface that is cylindrical or becomes conically wider toward the rear-side chamfer is formed.

9. The autofrettage tool apparatus of claim 8 wherein at least one of:
   the opening of the first securing means is flush with a longitudinal axis of the workpiece; or
   the second securing means comprises a recess that is flush with a longitudinal axis of the workpiece, the recess being configured as a recess for fluid or for a head of the die.

10. The autofrettage tool apparatus of claim 8 wherein the second securing means is solid or wherein the second securing means comprises a lower side configured to support the autofrettage tool apparatus and for transmission of die forces.

11. The autofrettage tool apparatus of claim 8 comprising an intermediate element disposed geometrically with respect to the die in the first securing means.

12. The autofrettage tool apparatus of claim 8 wherein the die comprises a head that is oversized relative to an internal dimension of the workpiece, the head being configured for mechanical autofrettage of the workpiece.

* * * * *